(12) United States Patent
Ando et al.

(10) Patent No.: US 11,415,246 B2
(45) Date of Patent: Aug. 16, 2022

(54) THREADED JOINT FOR STEEL PIPES

(71) Applicants: NIPPON STEEL CORPORATION, Tokyo (JP); VALLOUREC OIL AND GAS FRANCE, Aulnoye-Aymeries (FR)

(72) Inventors: Yoshinori Ando, Tokyo (JP); Shin Ugai, Tokyo (JP); Yousuke Oku, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 223 days.

(21) Appl. No.: 16/762,590

(22) PCT Filed: Nov. 29, 2018

(86) PCT No.: PCT/JP2018/044038
§ 371 (c)(1),
(2) Date: May 8, 2020

(87) PCT Pub. No.: WO2019/111803
PCT Pub. Date: Jun. 13, 2019

(65) Prior Publication Data
US 2020/0332929 A1    Oct. 22, 2020

(30) Foreign Application Priority Data

Dec. 5, 2017    (JP) .............................. JP2017-233106

(51) Int. Cl.
*F16L 15/06* (2006.01)
*F16L 15/00* (2006.01)
*E21B 17/042* (2006.01)

(52) U.S. Cl.
CPC .......... *F16L 15/001* (2013.01); *E21B 17/042* (2013.01); *F16L 15/06* (2013.01)

(58) Field of Classification Search
CPC ........ F16L 15/001; F16L 15/06; E21B 17/042
See application file for complete search history.

(56) References Cited

U.S. PATENT DOCUMENTS 2,587,544 A * 2/1952 Sneddon ............... F16L 15/002
285/391
3,079,181 A * 2/1963 Van Der Wissel ... F16L 15/001
285/333

(Continued)

FOREIGN PATENT DOCUMENTS

BR         0411049 B1    2/2018
CN       100529498 C    8/2009

(Continued)

OTHER PUBLICATIONS

Int'l. Search Report of PCT/JP2018/044038, dated Feb. 12, 2018.
Int'l. Search Report of PCT/JP2018/044038, dated Feb. 12, 2019.

*Primary Examiner* — David Bochna
(74) *Attorney, Agent, or Firm* — Greer Burns & Crain Ltd.

(57) ABSTRACT

The threaded joint includes a pin and a box. The pin includes a taper male thread part, and the box includes a taper female thread part to be engaged with the taper male thread part. The male thread part is divided into a first region on the free end side of the pin, and a second region on the tubular side of the pin along a tube axis direction. The taper ratio of the first region is greater than the taper ratio of the second region. The taper ratio of the first region is greater than the taper ratio of the female thread part. The taper ratio of the second region is equal to or greater than the taper ratio of the female thread part.

4 Claims, 3 Drawing Sheets

PFBS Two-stage Taper

(56) References Cited

U.S. PATENT DOCUMENTS

| | | | | | |
|---|---|---|---|---|---|
| 3,994,516 | A | * | 11/1976 | Fredd | F16L 15/02 285/392 |
| 4,033,167 | A | * | 7/1977 | Philibert | F16L 15/001 138/109 |
| 4,121,862 | A | * | 10/1978 | Greer | F16L 15/001 285/333 |
| 4,568,113 | A | * | 2/1986 | Axford | F16L 15/001 285/55 |
| 4,588,213 | A | * | 5/1986 | Bollfrass | E21B 17/0423 285/333 |
| 4,616,537 | A | * | 10/1986 | Axford | E21B 17/042 82/110 |
| 4,770,448 | A | * | 9/1988 | Strickland | E21B 17/042 285/333 |
| 5,221,113 | A | * | 6/1993 | Stoll | F16L 15/001 285/333 |
| 5,338,074 | A | | 8/1994 | Barringer et al. | |
| 5,360,239 | A | * | 11/1994 | Klementich | F16L 15/001 285/422 |
| 5,411,301 | A | * | 5/1995 | Moyer | F16L 15/001 285/55 |
| 7,347,459 | B2 | * | 3/2008 | Geary | E21B 17/042 285/333 |
| 2004/0251686 | A1 | * | 12/2004 | Otten | F16L 15/001 285/333 |
| 2015/0316181 | A1 | * | 11/2015 | Tejeda | E21B 17/042 285/66 |
| 2016/0195203 | A1 | * | 7/2016 | McElligott | E21B 17/042 285/390 |
| 2019/0128075 | A1 | * | 5/2019 | Urech | E21B 17/042 |
| 2021/0033136 | A1 | * | 2/2021 | Garcha | F16L 5/06 |

FOREIGN PATENT DOCUMENTS

| | | |
|---|---|---|
| JP | 60116994 A | 6/1985 |
| JP | 2002349775 A | 12/2002 |
| JP | 2005221038 A | 8/2005 |
| JP | 2010537135 A | 12/2010 |
| JP | 2012031988 A | 2/2012 |
| WO | 2004109173 A1 | 12/2004 |
| WO | 2006022418 A1 | 3/2006 |

* cited by examiner

PSBF Taper

Parallel Taper

PFBS Single Taper

PFBS Two-stage Taper

THREADED JOINT FOR STEEL PIPES

This is a National Phase Application filed under 35 U.S.C. § 371, of International Application No. PCT/JP2018/044038, filed Nov. 29, 2018, the contents of which are incorporated by reference.

TECHNICAL FIELD

The present disclosure relates to a threaded joint used for the connection of steel pipes.

BACKGROUND ART

In an oil well, a natural gas well, and the like (hereinafter collectively referred to as the "oil well"), steel pipes called Oil Country Tubular Goods (OCTG) are used in order to mine underground resources. The steel pipes are sequentially connected to each other. A threaded joint is used for the connection.

The types of a threaded joint for steel pipes are broadly classified into a coupling-type and an integral-type. In the case of a coupling-type threaded joint, of a pair of pipe materials to be connected, one pipe material is a steel pipe, and the other pipe material is a coupling. In this case, male thread parts are formed in the outer circumferences of the both ends of the steel pipe, and female thread parts are formed in the inner circumferences of the both ends of the coupling. Then, the steel pipe and the coupling are connected to each other. In the case of an integral-type threaded joint, a pair of pipe materials to be connected are both steel pipes, and a discrete coupling is not used. In this case, a male thread part is formed in the outer circumference of one end of the steel pipe, and a female thread part is formed in the inner circumference of the other end. Then, one steel pipe and the other steel pipe are connected to each other.

Since a joint portion of a tube end in which the male thread part is formed includes an element inserted into a female thread part, the joint portion is called a pin. On the other hand, since a joint portion of a tube end in which the female thread part is formed includes an element accepting the male thread part, the joint portion is called a box. Since these pin and box are the ends of the pipe materials, each of these is tubular.

The thread of the threaded joint for steel pipes is a taper thread. Therefore, a taper male thread part is formed in the pin. A taper female thread part to be engaged with the taper male thread part is formed in the box.

As fundamental performance, the sealing performance is required of the threaded joint. Additionally, the galling resistance is required of the threaded joint. It is because, when galling occurs in connection with screwing of the pin into the box at the time of fastening, the engagement of the thread parts becomes insufficient, and a desired sealing performance is not obtained. Further, nowadays, the anti-fatigue performance is required of the threaded joint. It is because a large bending load is repeatedly applied to the threaded joint as the oil well environment becomes severer and a new drilling technology is adopted.

The technology for improving the anti-fatigue performance of the threaded joint is disclosed in, for example, Japanese Patent Application Publication No. 2005-221038 (Patent Literature 1) and Japanese Patent Application Publication No. 2010-537135 (Patent Literature 2). In the technologies disclosed in Patent Literatures 1 and 2, shot peening is performed on specific portions of the surfaces of the thread parts (the male thread part and the female thread part). The hardness of the specific portions on which shot peening is performed is increased, and compressive residual stress is introduced into the surface layers of the specific portions. As a result, the fatigue strength becomes high.

CITATION LIST

Patent Literature

Patent Literature 1: Japanese Patent Application Publication No. 2005-221038
Patent Literature 2: Japanese Patent Application Publication No. 2010-537135

SUMMARY OF INVENTION

Technical Problem

In the case of the threaded joint disclosed in Patent Literatures 1 and 2, it is necessary to perform shot peening only on the specific portions of the thread parts (the male thread part and the female thread part). This is because of the following reasons. Generally, the surface roughness of a region in which shot peening is performed becomes large. Therefore, when shot peening is performed on portions other than the specific portions, there is a possibility that galling occurs at the time of fastening. However, it is very difficult to uniformly perform shot peening only on the specific portions of the thread parts having complicated shapes.

An object of the present disclosure is to provide a threaded joint for steel pipes with the following characteristics: the anti-fatigue performance can be improved while securing the galling resistance.

Solution to Problem

A threaded joint for steel pipes according to an embodiment of the present disclosure includes a tubular pin and a tubular box. The pin includes a taper male thread part, and the box includes a taper female thread part to be engaged with the taper male thread part. The taper male thread part is divided into a first region on the free end side of the pin, and a second region on the tubular side of the pin along a tube axis direction. The taper ratio of the first region is greater than the taper ratio of the second region. The taper ratio of the first region is greater than the taper ratio of the taper female thread part. The taper ratio of the second region is equal to or greater than the taper ratio of the taper female thread part.

Advantageous Effects of Invention

The threaded joint for steel pipes according to the embodiment of the present disclosure exhibits the following remarkable effects: the anti-fatigue performance can be improved while securing the galling resistance.

DESCRIPTION OF EMBODIMENTS

In order to achieve the object, the inventors have conducted various examinations while paying attention to the shape of a thread part. As a result, the following knowledge has been obtained.

Figure 1:
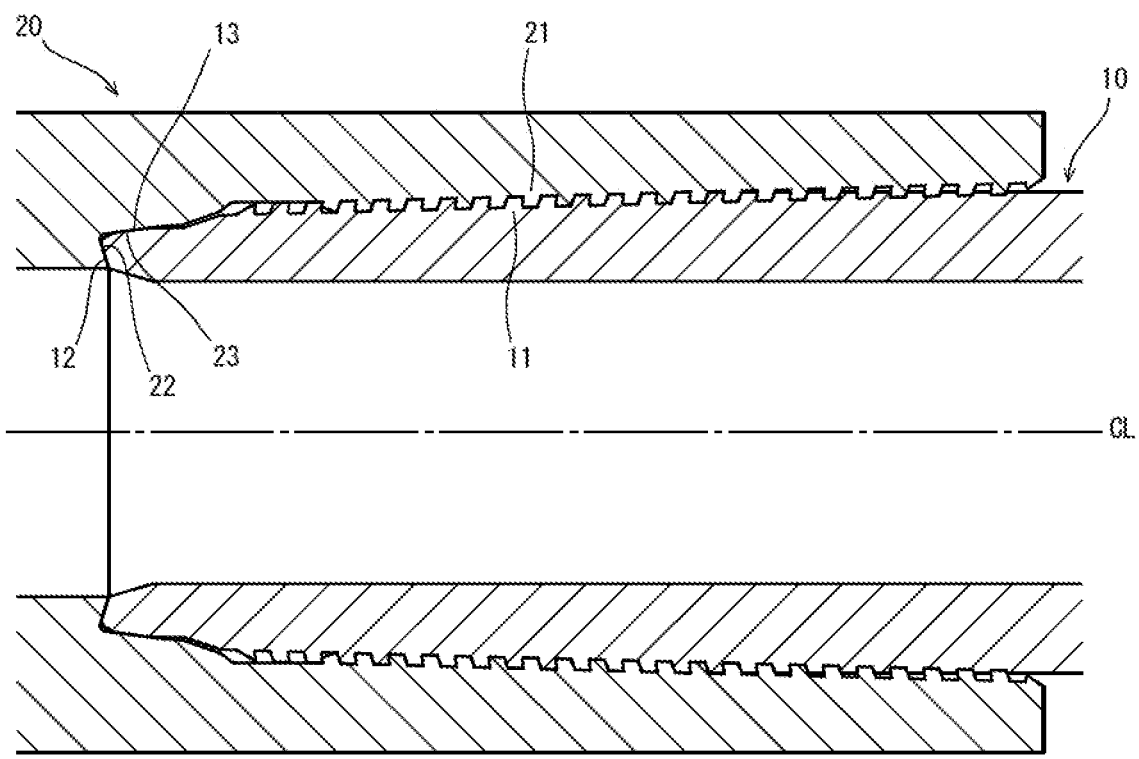
FIG. 1 is a longitudinal sectional view showing a representative example of a threaded joint for steel pipes.
Figure 2:
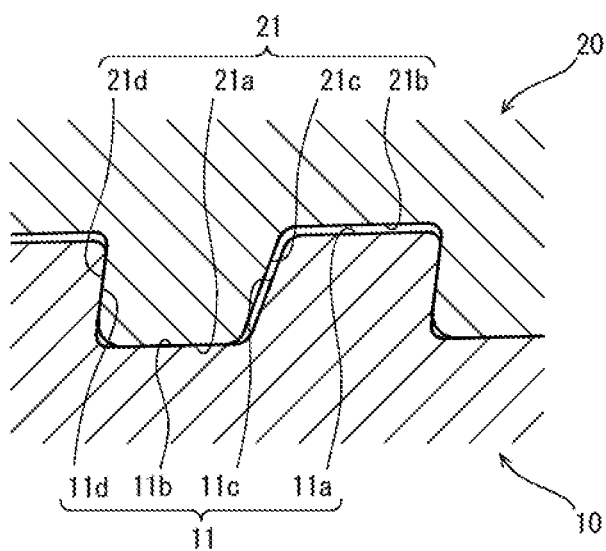
FIG. 2 is an enlarged longitudinal sectional view of a thread part of the threaded joint shown in FIG. 1.

FIG. 1 is a longitudinal sectional view showing a representative example of a threaded joint for steel pipes. FIG. 2 is an enlarged longitudinal sectional view of a thread part of the threaded joint shown in FIG. 1. A coupling-type threaded joint is shown in FIG. 1. The threaded joint includes a pin 10 and a box 20. The thread of the threaded joint is a taper thread.

The pin 10 includes a taper male thread part (hereinafter also simply referred to as the "male thread part") 11. The box 20 includes a taper female thread part (hereinafter also simply referred to as the "female thread part") 21 corresponding to the male thread part 11 of the pin 10.

The male thread part 11 of the pin 10 includes crests 11a, roots 11b, stabbing flanks 11c, and load flanks 11d. On the other hand, the female thread part 21 of the box 20 includes crests 21a, roots 21b, stabbing flanks 21c, and load flanks 21d. The crests 11a of the male thread part 11 are opposed to the roots 21b of the female thread part 21. The roots 11b of the male thread part 11 are opposed to the crests 21a of the female thread part 21. The stabbing flanks 11c of the male thread part 11 are opposed to the stabbing flanks 21c of the female thread part 21. The load flanks 11d of the male thread part 11 are opposed to the load flanks 21d of the female thread part 21. The each flank angle of the load flanks 11d and 21d is a negative angle, and the load flanks 11d and 21d are strongly pressed against each other in a fastening state. The each flank angle of the stabbing flanks 11c and 21c is a positive angle.

The male thread part 11 engages with the female thread part 21 in a fastening state. In other words, the roots 11b of the male thread part 11 contact the crests 21a of the female thread part 21. The load flanks 11d of the male thread part 11 contact the load flanks 21d of the female thread part 21. Gaps are formed between the crests 11a of the male thread part 11 and the roots 21b of the female thread part 21. Gaps are formed between the stabbing flanks 11c of the male thread part 11 and the stabbing flanks 21c of the female thread part 21. These gaps are filled with a lubricant. Accordingly, a thread sealing part is formed by the engagement between the male thread part 11 and the female thread part 21. In a fastening state, the male thread part 11 is engaged with the female thread part 21 by a predetermined interference amount.

In the threaded joint shown in FIG. 1, a shoulder face 12 is provided at the free end of the pin 10. A shoulder face 22 corresponding to the shoulder face 12 of the pin 10 is provided in the box 20. The shoulder face 12 of the pin 10 contacts the shoulder face 22 of the box 20 in a fastening state. Accordingly, a tightening axial force is applied to the load flanks 11d of the male thread part 11 of the pin 10.

In the threaded joint shown in FIG. 1, a sealing face 13 is provided between the shoulder face 12 and the male thread part 11 of the pin 10. A sealing face 23 is provided between the shoulder face 22 and the female thread part 21 of the box 20. The sealing face 13 of the pin 10 contacts the sealing face 23 of the box 20 in a fastening state. Accordingly, a sealing part is formed by the contact between the sealing face 13 and the sealing face 23.

Here, regarding the threaded joint shown in FIG. 1 and FIG. 2, the present inventors studied four types of threaded joints having different shapes of a thread part. FIG. 3 to FIG. 6 schematically show the shapes of the thread parts of the respective threaded joints. In each of the threaded joints shown in FIG. 3 to FIG. 6, a taper ratio Tb of the female thread part 21 is constant over the entire region of the thread part. In other words, the taper of the female thread part 21 is a single taper.

Figure 3:
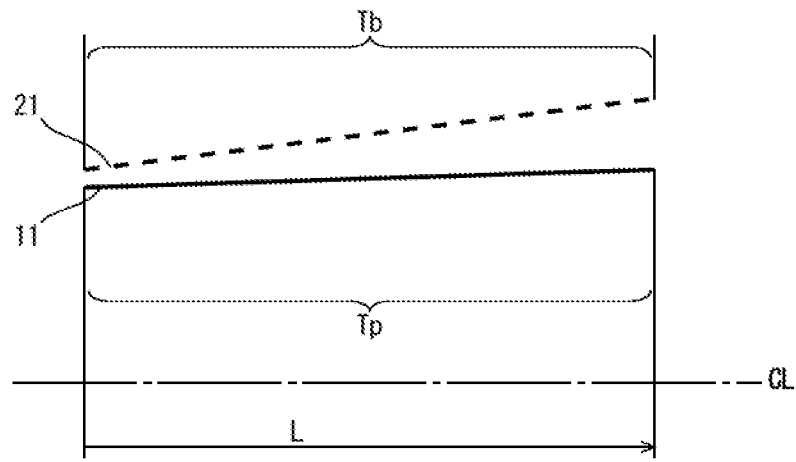
FIG. 3 is a diagram schematically showing a threaded joint in which the taper ratio of a male thread part is smaller than the taper ratio of a female thread part.
Figure 3:
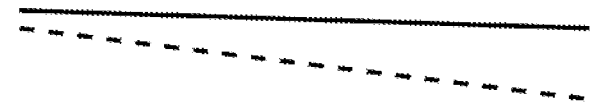
Figure 4:
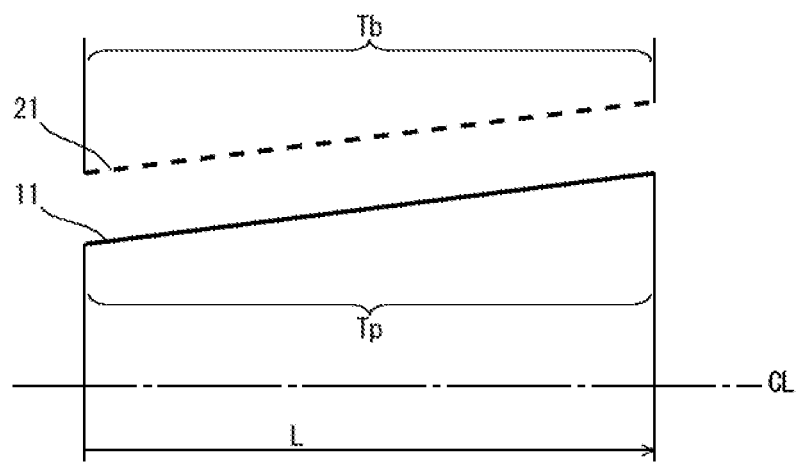
FIG. 4 is a diagram schematically showing a threaded joint in which the taper ratio of a male thread part is the same as the taper ratio of a female thread part.
Figure 4:
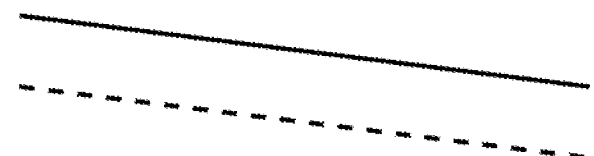
Figure 5:
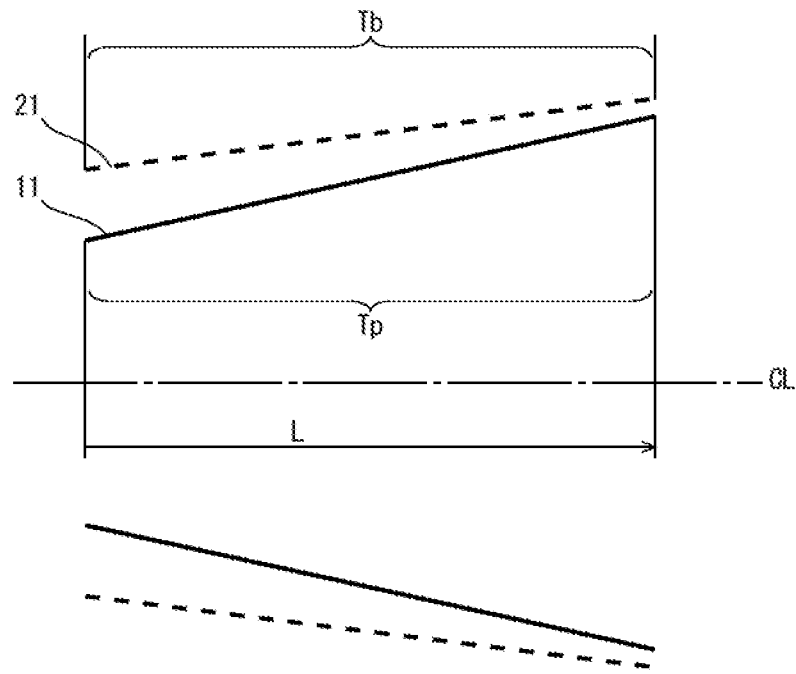
FIG. 5 is a diagram schematically showing a threaded joint in which the taper of a male thread part is a single taper, and the taper ratio of the male thread part is greater than the taper ratio of a female thread part.
Figure 6:
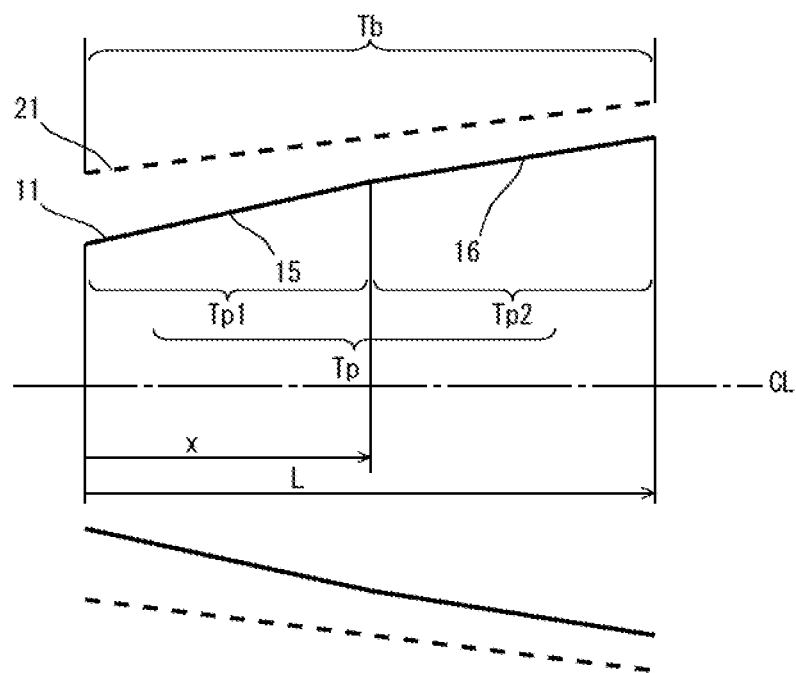
FIG. 6 is diagram schematically showing a threaded joint in which the taper of a male thread part is a two-stage taper, and the taper ratio of the male thread part is greater than the taper ratio of a female thread part.

In the threaded joints shown in FIG. 3 to FIG. 5, a taper ratio Tp of the male thread part 11 is constant over the entire region of the thread part. In other words, the taper of the male thread part 11 is a single taper. In contrast, in the threaded joint shown in FIG. 6, the male thread part 11 is divided into two regions 15 and 16 along a tube axis CL direction, and the taper ratio Tp (Tp1 and Tp2) of the male thread part 11 changes along the way. In other words, the male thread part 11 is divided into a first region 15 on the free end side of the pin and a second region 16 on the tubular side of the pin, and the taper of the male thread part 11 (the first region 15 and the second region 16) is a two-stage taper. In FIG. 3 to FIG. 6, the total length of the male thread part 11 in the tube axis CL direction is indicated by L. In FIG. 6, the distance in the tube axis CL direction from an end of the male thread part 11 on the free end side of the pin to the border between the first region 15 and the second region 16 is indicated by x.

More specifically, in the threaded joint shown in FIG. 3, the taper ratio Tp of the male thread part 11 is smaller than the taper ratio Tb of the female thread part 21. Hereinafter, the threaded joint shown in FIG. 3 is also referred to as a PSBF (Pin-Slow Box-Fast) taper threaded joint. In the common threaded joint shown in FIG. 4, the taper ratio Tp of the male thread part 11 is the same as the taper ratio Tb of the female thread part 21. Hereinafter, the threaded joint shown in FIG. 4 is also referred to as a parallel taper threaded joint. In the threaded joint shown in FIG. 5, the taper ratio Tp of the male thread part 11 is greater than the taper ratio Tb of the female thread part 21. Hereinafter, the threaded joint shown in FIG. 5 is also referred to as a PFBS (Pin-Fast Box-Slow) single taper threaded joint. In contrast, in the threaded joint shown in FIG. 6, the taper ratio Tp (Tp1 and Tp2) of the male thread part 11 (the first region 15 and the second region 16) is greater than the taper ratio Tb of the female thread part 21, and a taper ratio Tp1 of the first region 15 is greater than a taper ratio Tp2 of the second region 16. Hereinafter, the threaded joint shown in FIG. 6 is also referred to as a PFBS two-stage taper threaded joint.

A bending fatigue test was conducted by making a sample for each of the PSBF taper threaded joint, the parallel taper threaded joint, the PFBS single taper threaded joint, and the PFBS two-stage taper threaded joint. It is possible to evaluate the anti-fatigue performance of the threaded joints by the fatigue test. The main characteristics regarding the material and dimensions of the samples used for this test were as follows.

dimensions: 9⅝ [inch], 47 [lb/ft](outer diameter of 244.48 mm, wall thickness of 11.99 mm)

material grade: carbon steel (API Standard L80) having the tensile yield strength of 80 ksi (552 MPa) to 95 ksi (655 MPa)

Here, in a PSBF taper threaded joint shown in FIG. 3, the taper ratio Tp of the male thread part 11 was set to 5.4%, and the taper ratio Tb of the female thread part 21 was set to 5.7%. In a parallel taper threaded joint shown in FIG. 4, the taper ratio Tp of the male thread part 11 and the taper ratio Tb of the female thread part 21 were set to 5.55%. In a PFBS single taper threaded joint shown in FIG. 5, the taper ratio Tp of the male thread part 11 was set to 5.7%, and the taper ratio Tb of the female thread part 21 was set to 5.4%. In a PFBS two-stage taper threaded joint shown in FIG. 6, the taper ratio Tp1 of the first region 15 was set to 5.7%, the taper ratio Tp2 of the second region 16 was set to 5.55%, and the taper ratio Tb of the female thread part 21 was set to 5.4%. Further, x was set to 45% of L in the male thread part 11 including the first region 15 and the second region 16.

Additionally, a make/break test of repeating fastening and unfastening was conducted by making a sample for each of the PSBF taper threaded joint, the parallel taper threaded joint, the PFBS single taper threaded joint, and the PFBS two-stage taper threaded joint. It is possible to evaluate the galling resistance by the make/break test. The main characteristics regarding the material and dimensions of the samples used for this test were as follows. In this test, the torque at the fastening was 23,650 (−1,000/+0) [ft-lbs](32,065 (−1,356/+0) Nm).

dimensions: 7 [inch], 35 [lb/ft](outer diameter of 177.8 mm, wall thickness of 12.65 mm)

material grade: nickel base alloy having the tensile yield strength of 110 ksi (758 MPa) to 140 ksi (965 MPa)

As a result of the fatigue test, the fatigue strength of the PFBS single taper threaded joint (see FIG. 5) was equivalent to the fatigue strength of the PFBS two-stage taper threaded joint (see FIG. 6), and the fatigue strengths of these were the highest. The fatigue strength of the PSBF taper threaded joint (see FIG. 3) was the lowest. In the parallel taper threaded joint, the PFBS single taper threaded joint, and the PFBS two-stage taper threaded joint, which exhibited the high fatigue strengths, cracks were generated in roots of an incomplete thread region of the male thread part region. The incomplete thread region of the male thread part is the region on the tubular side of the pin. On the other hand, in the PSBF taper threaded joint, which exhibited the lowest fatigue strength, cracks were generated due to stress concentration in corner portions of roots and load flanks of a complete thread region of the male thread part region.

In contrast, as a result of the make/break test, the number of times of making/breaking of the PFBS single taper threaded joint (see FIG. 5) was the lowest. The number of times of making/breaking of the PSBF taper threaded joint (see FIG. 3) was the highest. The number of times of making/breaking of the PFBS two-stage taper threaded joint (see FIG. 6) was equivalent to the number of times of making/breaking of the parallel taper threaded joint (see FIG. 4). Especially, the number of times of making/breaking of the PFBS two-stage taper threaded joint was five times the number of times of making/breaking of the PFBS single taper threaded joint.

From the above test results, the following is shown. The PFBS single taper threaded joint exhibits an excellent anti-fatigue performance compared with the parallel taper threaded joint and the PSBF taper threaded joint. The PFBS two-stage taper threaded joint exhibits the galling resistance equivalent to that of the parallel taper threaded joint, and moreover exhibits an excellent anti-fatigue performance compared with the parallel taper threaded joint and the PSBF tape threaded joint.

A threaded joint exhibiting anti-fatigue performance and galling resistance equivalent to those of the PFBS two-stage taper threaded joint (see FIG. 6) may be realized by forming the taper of the male thread part 11 into a single taper, and forming the taper of the female thread part 21 into a two-stage taper. However, the following problems occur in this case. The chamfer portion of the female thread part is increased, which makes it impossible to secure a sufficient effective length for the female thread part. Therefore, when a tensile load is applied to the threaded joint, the phenomenon in which the thread is detached, the so-called jump-out, tends to occur. The sealing performance of the thread part is also degraded. Additionally, it is also difficult to perform threading.

The threaded joint for steel pipes according to the present disclosure has been completed on the basis of the above findings.

The threaded joint for steel pipes according to the present disclosure includes a tubular pin and a tubular box. The pin includes a taper male thread part, and the box includes a taper female thread part to be engaged with the taper male thread part. The taper male thread part is divided into a first region on the free end side of the pin and a second region on the tubular side of the pin along the tube axis direction. The taper ratio of the first region is greater than the taper ratio of the second region. The taper ratio of the first region is greater than the taper ratio of the taper female thread part. The taper ratio of the second region is equal to or greater than the taper ratio of the taper female thread part.

According to such a threaded joint, it is possible to improve the anti-fatigue performance, because the taper ratio of the first region of the male thread part is greater than the taper ratio of the female thread part and the taper ratio of the second region of the male thread part equal to or is greater than the taper ratio of the female thread part. Moreover, it is possible to secure the galling resistance, because the taper ratio of the first region is greater than the taper ratio of the second region.

As a typical example, the threaded joint of this embodiment is a coupling-type threaded joint. However, the type of the threaded joint is not particularly limited and may be an integral-type.

As a typical example, a taper thread including a male thread part and a female thread part is a buttress taper thread. The buttress taper thread includes a simple trapezoidal thread having a load flank inclined at a positive angle, and a special trapezoidal thread having a load flank inclined at a negative angle. These trapezoidal threads also include a taper thread specified by the API standard.

In the case of a threaded joint to which a buttress taper thread is applied, in a fastening state, roots of the male thread part (the first and second regions) contact crests of the female thread part. The load flanks of the male thread part contact the load flanks of the female thread part. Gaps are formed between the crests of the male thread part and the roots of the female thread part. Gaps are formed between the stabbing flanks of the male thread part and the stabbing flanks of the female thread part.

However, the state where the male thread part is engaged with the female thread part is not particularly limited as long as the load flanks contact to each other. For example, instead of the contact between the roots of the male thread part and the crests of the female thread part, the crests of the male thread part may contact the roots of the female thread part. In short, in a fastening state, the male thread part should be engaged with the female thread part by a predetermined interference amount.

In the above threaded joint, it is preferable that Tp1, Tp2 and Tb satisfy the conditions of Formulae (1), (2) and (3), where Tp1 is the taper ratio of the first region, Tp2 is the taper ratio of the second region, and Tb is the taper ratio of the taper female thread part.

$$1.00 < Tp1/Tb < 1.10 \quad (1)$$

$$1.005 \leq Tp2/Tb < 1.10 \quad (2)$$

$$0.94 < Tp2/Tp1 < 1.00 \quad (3)$$

In terms of the anti-fatigue performance, the greater the taper ratios Tp1 and Tp2 of the first and second regions (the male thread part), respectively, with respect to the taper ratio Tb of the female thread part, the better. Accordingly, as for Formula (1), it is preferable that Tp1/Tb is more than 1.00. A more preferable lower limit for Tp1/Tb is 1.015. On the other hand, if Tp1/Tb is too great, the engaging length of the first region of the male thread part with the female thread part becomes too short. Therefore, it is preferable that Tp1/Tb is less than 1.10. A more preferable upper limit for Tp1/Tb is 1.08. Additionally, though the same applies to Formula (2), it is preferable that Tp2/Tb is 1.00 or more in view of the galling resistance, which will be described later. A more preferable lower limit for Tp2/Tb is 1.005.

In terms of the galling resistance, the smaller the taper ratio Tp2 of the second region (the male thread part) with respect to the taper ratio Tb of the female thread part, the better. Accordingly, as for Formula (2), it is preferable that Tp2/Tb is less than 1.10. A more preferable upper limit for Tp2/Tb is 1.07. Additionally, the smaller the taper ratio Tp2 of the second region with respect to the taper ratio Tp1 of the first region, the better. Accordingly, as for Formula (3), it is preferable that Tp2/Tp1 is less than 1.00. A more preferable upper limit for Tp2/Tp1 is 0.985. On the other hand, if Tp2/Tp1 is too small, the engaging length of the first region of the male thread part with the female thread part becomes too short, compared with the engaging length of the second region of the male thread part with the female thread part. Therefore, it is preferable that Tp2/Tp1 is more than 0.94. A more preferable lower limit for Tp2/Tp1 is 0.95.

The taper ratios Tp1 and Tp2 of the first and second regions (the male thread part), respectively, and the taper ratio T of the female thread part are set within the range that satisfies the conditions of Formulae (1), (2) and (3). For example, the taper ratios Tp1, Tp2, and T are 5.0% to 10.5%.

In the above threaded joint, it is preferable that x is within the range from 20% or more of L to 80% or less of L, where L is the total length in the tube axis direction of the taper male thread part, and x is the distance in the tube axis direction from the end of the taper male thread part on the free end side of the pin to the border between the first region and the second region.

If x is within the range from 20% or more of L to 80% or less of L, it is possible to effectively secure the galling resistance and to effectively improve the anti-fatigue performance. Especially, in terms of the anti-fatigue performance, it is preferable that x is 25% or more of L. More preferably, x is 50% or more of L. On the other hand, in terms of the galling resistance, it is preferable that x is 75% or less of L. More preferably, x is 60% or less of L.

As a typical example, the pin includes the shoulder face arranged at the free end of the pin, and the box includes the shoulder face corresponding to the shoulder face of the pin. The shoulder face of the pin contacts the shoulder face of the box in a fastening state. In this case, the pin may include the sealing face arranged between the shoulder face and the taper male thread part, and the box may include the sealing face corresponding to the sealing face of the pin. The sealing face of the pin contacts the sealing face of the box in a fastening state.

In addition, needless to say, the present disclosure is not limited to the above embodiment, and various modifications can be made within the scope that does not depart from the spirit of the present disclosure.

INDUSTRIAL APPLICABILITY

The threaded joint of the present disclosure can be effectively used for the connection of steel pipes used as the OCTG.

REFERENCE SIGNS LIST 10 pin
11 taper male thread part
11a crest
11b root
11c stabbing flank
11d load flank
12 shoulder face
13 sealing face
15 first region of taper male thread part
16 second region of taper male thread part
20 box
21 taper female thread part
21a crest
21b root
21c stabbing flank
21d load flank
22 shoulder face
23 sealing face
CL tube axis

The invention claimed is:

1. A threaded joint for steel pipes, the threaded joint comprising a tubular pin and a tubular box,
wherein the pin includes a taper male thread part, and the box includes a taper female thread part to be engaged with the taper male thread part,
the taper male thread part is divided into a first region on a free end side of the pin and a second region on a tubular side of the pin along a tube axis direction, and
a taper ratio of the first region is greater than a taper ratio of the second region, the taper ratio of the first region is greater than a taper ratio of the taper female thread part, and the taper ratio of the second region is equal to or greater than the taper ratio of the taper female thread part,
the pin further includes a shoulder face arranged on a free end of the pin and a sealing face arranged between the shoulder face and the taper male thread part, and
the box further includes a shoulder face corresponding to the shoulder face of the pin and a sealing face corresponding to the sealing face of the pin.

2. The threaded joint for steel pipes according to claim 1, wherein Tp1, Tp2 and Tb satisfy the conditions of Formulae (1), (2) and (3), where Tp1 is the taper ratio of the first region, Tp2 is the taper ratio of the second region, and Tb is the taper ratio of the taper female thread part:

$$1.00 < Tp1/Tb < 1.10 \quad (1)$$

$$1.00 \leq Tp2/Tb < 1.10 \quad (2)$$

$$0.94 < Tp2/Tp1 < 1.00 \quad (3).$$

3. The threaded joint for steel pipes according to claim 2, wherein x is within a range from 20% or more of L to 80% or less of L, where L is the total length in the tube axis direction of the taper male thread part, and x is the distance in the tube axis direction from an end of the taper male thread part on the free end side of the pin to the border between the first region and the second region.

4. The threaded joint for steel pipes according to claim 1, wherein x is within a range from 20% or more of L to 80% or less of L, where L is the total length in the tube axis direction of the taper male thread part, and x is the distance in the tube axis direction from an end of the taper male thread part on the free end side of the pin to the border between the first region and the second region.

\* \* \* \* \*